(12) United States Patent
Schmüdderich

(10) Patent No.: US 9,308,919 B2
(45) Date of Patent: Apr. 12, 2016

(54) COMPOSITE CONFIDENCE ESTIMATION FOR PREDICTIVE DRIVER ASSISTANT SYSTEMS

(71) Applicant: HONDA RESEARCH INSTITUTE EUROPE GMBH, Offenbach/Main (DE)

(72) Inventor: Jens Schmüdderich, Offenbach (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 0 days.

(21) Appl. No.: 14/520,531

(22) Filed: Oct. 22, 2014

(65) Prior Publication Data

US 2015/0112571 A1   Apr. 23, 2015

(30) Foreign Application Priority Data

Oct. 22, 2013   (EP) .................................... 13189698

(51) Int. Cl.
*B60W 50/00* (2006.01)
*G06N 5/04* (2006.01)
*B60W 30/08* (2012.01)
*B60W 30/14* (2006.01)
*B60W 40/04* (2006.01)
*G06K 9/00* (2006.01)
(Continued)

(52) U.S. Cl.
CPC .......... *B60W 50/0097* (2013.01); *B60W 30/08* (2013.01); *B60W 30/14* (2013.01); *B60W 40/04* (2013.01); *G06K 9/00805* (2013.01); *G06K 9/6292* (2013.01); *G06N 5/04* (2013.01); *B60W 30/18163* (2013.01); *B60W 2050/0022* (2013.01); *B60W 2550/20* (2013.01)

(58) Field of Classification Search
CPC ....... G01S 13/931; G01S 13/00; G01S 13/12; G01S 2013/9314
See application file for complete search history.

(56) References Cited

U.S. PATENT DOCUMENTS 5,343,206 A    8/1994  Ansaldi et al.
6,301,532 B1  10/2001  Kull et al.
(Continued)

FOREIGN PATENT DOCUMENTS

DE    10 2006 057 277 A1   6/2008
DE    10 2011 001 904 A1  10/2012
EP         2 562 060 A1    2/2013

OTHER PUBLICATIONS

European Search Report dated Mar. 20, 2014 corresponding to European Patent Application No. 13189690.4.
(Continued)

*Primary Examiner* — Redhwan K Mawari
(74) *Attorney, Agent, or Firm* — Squire Patton Boggs (US) LLP

(57) ABSTRACT

The invention relates to a driving assistance system including a prediction subsystem in a vehicle. According to a method aspect of the invention, the method comprises the steps of accepting a set of basic environment representations; allocating a set of basic confidence estimates; associating weights to the basic confidence estimates; calculating a weighted composite confidence estimate for a composite environment representation; and providing the weighted composite confidence estimate as input for an evaluation of a prediction based on the composite environment representation.

15 Claims, 7 Drawing Sheets

(51) Int. Cl.
*G06K 9/62* (2006.01)
*B60W 30/18* (2012.01)

(56) References Cited

U.S. PATENT DOCUMENTS

| | | | |
|---|---|---|---|
| 7,340,380 B2 | 3/2008 | Klotz et al. | |
| 9,187,091 B2 | 11/2015 | Mills | |
| 2005/0010351 A1* | 1/2005 | Wagner | B60K 31/0008 701/96 |
| 2005/0021201 A1* | 1/2005 | Klotz | B60W 30/16 702/189 |
| 2007/0203617 A1 | 8/2007 | Haug | |
| 2010/0228419 A1* | 9/2010 | Lee | B60W 30/0953 701/25 |
| 2010/0265330 A1* | 10/2010 | Li | B60Q 1/143 348/148 |
| 2013/0099943 A1* | 4/2013 | Subramanya | G01S 7/2926 340/933 |
| 2015/0112571 A1* | 4/2015 | Schmudderich | B60W 30/08 701/93 |

OTHER PUBLICATIONS

Ismail Dagli et al., "Cutting-in Vehicle Recognition for ACC Systems—Towards Feasible Situation Analysis Methodologies," Intelligent Vehicles Symposium, Jun. 14-17, 2004, IEEE Proceedings 2004, pp. 925-930.
Adrian Broadhurst et al., "Monte Carlo Road Safety Reasoning," Intelligent Vehicles Symposium, Jun. 6-8, 2005, IEEE Proceedings 2005, pp. 319-324.
European Search Report dated Mar. 28, 2014 corresponding to European Patent Application No. 13189698.7.
US Office Action U.S. Appl. No. 14/520,501 mailed Dec. 4, 2015.

* cited by examiner

COMPOSITE CONFIDENCE ESTIMATION FOR PREDICTIVE DRIVER ASSISTANT SYSTEMS

BACKGROUND

1. Field

The present invention relates to a driving assistance system including a prediction subsystem for passive or active assistance of a driver of a vehicle, and further relates to a corresponding method, software product, and a vehicle equipped with such a driving assistance system.

2. Description of Related Art

A manifold of driving assistance systems for vehicles is available today which aim at increasing driving comfort and/or safety of the passengers of a vehicle. Based on various sensor equipment such as radar, lidar, cameras, etc., functions related to driving or maneuvering range from distance sensing and parking assistance to sophisticated "Advanced Driver Assistant Systems" (ADAS) such as, for example, cruise-control functions, e.g. "Intelligent Adaptive Cruise Control" (IACC), which may include a lane change assistant, collision mitigation functions, emergency braking, etc.

Functions related to, e.g., ADAS may include a detection of other vehicles or objects moving in front or behind the ego-vehicle, and may include functions for predicting a future behavior of moving objects. The predictions may be used by the driving assistant for active control of the ego-vehicle and/or for providing information to the driver, e.g. for presenting a warning message via display or audio means to the driver.

While predictions serve generally well as a basis for decisions in advanced driver assistance systems, there remain problems. There is a general demand for advanced assistance functions to operate with high reliability, which includes avoiding situations that may let the driver feel uncomfortable or that may even require intervention of the driver.

However, sensor data are generally limited in accuracy due to limitations of the available sensor equipment, its range, orientation, etc., and due to inherent uncertainties of the measurement techniques. Besides error margins in the sensor data, sensor systems are also prone to errors such as misdetection, late detections, and/or wrong detections of entities in the environment of the host vehicle. These error sources may in turn lead to less reliable predictions, and driving assistants need to implement strategies to deal with uncertainties in the sensor data and sensing results.

On a more detailed level, the operation of some driving assistant functions may be based on sensing one entity only; as an example, a simple cruise control function may comprise keeping a predetermined distance to the preceding vehicle. In this case the operation is limited by the detection accuracy of the sensor data related to the detection of the preceding vehicle only. However, more sophisticated functions may require data related to multiple entities or objects, and may require even secondary data derived from the sensor data, such as data representing, e.g., a gap between two vehicles detected in the vicinity of the host vehicle. It is clear that an error such as a misdetection of one of the vehicles will cause an error in the assistant function; however, also mere inaccuracies in the detected positions of the two vehicles lead to an accumulated inaccuracy in the derived gap width which may result in a wrong decision on whether the gap is or will be sufficient for a third vehicle to perform a lane change. Predictions based on such decisions may in turn also be wrong and may result in a system response which appears confusing and unacceptable to the driver and/or other traffic participants.

The straightforward solution to enhancing system reliability is providing additional sensor equipment and/or high-performance equipment. This may serve to improve the available data basis, but at increasing hardware complexity and costs.

Assuming instead a given sensor equipment, various approaches to deal with sensor data inaccuracies are known for driving assistants with prediction subsystems. Some approaches explicitly assume perfect sensor equipment without taking further measures.

Broadhurst, A., et al., "Monte Carlo Road Safety Reasoning", Intelligent Vehicles Symposium, 6-8 Jun. 2005, IEEE Proceedings 2005, p. 319-324, ISBN: 0-7803-8961-1, describe a framework for reasoning about the future motion of multiple objects in a road scene. Monte Carlo path planning is used to generate a probability distribution for the possible future motion of every car in the scene. The car may be controlled directly using the best predicted action, or the car may display a recommended path to the driver, or may display warnings on dangerous objects or regions on the road. Sensor uncertainty is said to be a future consideration.

According to another approach, errors in the perception of the environment are only implicitly considered.

US 2010/0228419 A1 describes a technique for risk assessment in an autonomic vehicle control system. Each of a plurality of objects detected proximate to a vehicle is monitored by various sensor equipment such as long- and short-range radar and a front camera. Sensor data are fused and, based on the fused data, object locations are predicted relative to a projected trajectory of the ego-vehicle. A collision risk level between the vehicle and each of the objects during a lane-change maneuver is assessed with respect to potential actions of the detected objects such as continuing with a fixed velocity, mild braking, or hard braking. A lane change maneuver is controlled according to the assessment and risk tolerance rules specifying spatial safety margins.

Sensor accuracy is discussed and it is appreciated that sensory detection and measurement of object locations and conditions are to be referred to as "estimates". However, no explicit treatment of these estimates is performed any further. The fused object data comprise a degree of confidence in the data estimate.

EP 2 562 060 A1 (EP'060 for short hereinafter) describes a technique in a host vehicle for predicting a movement behavior of a target traffic object with exemplary emphasis on target objects cutting-in to a lane of the host vehicle or cutting-out from the lane of the host vehicle. The technique is based on two separate prediction modules, wherein a context based prediction (CBP) is related to a recognition of a movement behavior, i.e. a determination of "what" will happen, while a physical prediction (PP) is related to a determination of "how" a behavior will or may happen. The context based prediction relies on at least indirect indicators, while the physical prediction relies on direct indicators.

An indicator comprises a measurable variable conveying information about the future or ongoing behavior of a target vehicle and a confidence value indicating the true-state of the measurable variable. The confidence value is obtained by combining the sensor-confidence of all perceived scene elements which have been evaluated for the computation of the measurable variable, wherein the sensor confidence is a value for the reliability of the sensed information. Indicators can be combined with each other.

Direct indicators comprise observable variables, which are observable if and only if the behavior to be detected has started. For example, for predicting a lane-change, a set of direct indicators may comprise one or more of a lateral velocity, a lateral position relative to the lane, a changing orientation relative to the lane, and a changing orientation relative to other traffic participants.

Indirect indicators comprise observable variables, which are already observable before the predicted behavior has started. Indirect indicators may be defined as a set of indicators excluding direct indicators. For example, indirect indicators may relate to information about a relation between at least one traffic participant and one or more other traffic participants or static scene elements, such as an indicator indicating whether or not a fitting gap is available on a lane neighboring to the host-vehicle.

Other indirect indicators may relate to information about driver intentions, which may actively be communicated by the traffic participant whose behavior is to be predicted. Examples are intentions presumably indicated with a turning-signal, a braking-light, or information received via car-to-car communication.

A set of potential trajectories may be computed for a target vehicle. By using the predicted movement behaviors from CBP, the set of relevant trajectories may be reduced. Matching a situation model against the history of perceived positional data in PP may help to further reduce the relevant trajectories.

More specifically, for predicting a target vehicle's future positions, in a first step, the probability for the target vehicle to perform one of a set of possible movement behaviors is estimated by the CBP. Some or all of these movement behaviors are validated by means of a PP. The purpose of the physical prediction is twofold: First, it validates the set of possible trajectories against a combination of the results of the CBP, the physical evidence, and vehicle relations. Second, it estimates the future position of each vehicle. In a final step a mismatch detection analyzes the consistency of the PP and the CBP. In case of mismatch, a fallback to the PP can be performed.

The context based prediction, physical prediction, and mismatch detection can be encapsulated in situation specific models and may be performed by different hardware units within the driver assistance system. Suited models fitting to the vehicle's environment can be activated or deactivated based on environment perception or self-localization.

Active control resulting from a wrong prediction based on sensor inaccuracy or sensing errors may need to be stopped and reversed when the target vehicle shows an unpredicted behavior or a behavior which has been predicted with low probability. The resultant control may seem inappropriate, confusing and not comfortable to the driver and/or other traffic participants. The assistance system described in EP'060 therefore intends to minimize wrong predictions as far as possible by means of the introduction of situation models and a mismatch detection, amongst others.

According to still another approach to enhance system reliability, sensor uncertainty is modeled and may then directly or indirectly influence the prediction result. Sensor uncertainties can be modeled, e.g., based on assumptions of sensor accuracy. The estimated uncertainties may then influence the prediction result.

Dagli, I., et al., "Cutting-in Vehicle Recognition for ACC Systems—Towards Feasible Situation Analysis Methodologies", Intelligent Vehicles Symposium, 14-17 Jun. 2004, IEEE Proceedings 2004, p. 925-930, ISBN: 0-7803-8310-9, describe a cutting-in vehicle recognition functionality for ACC systems that utilizes a probabilistic model for situation analysis and prediction. In order to cope with low sensor data quality, sensor data filtering is combined with Kalman filters and situation analysis with probabilistic networks, in order that low quality sensor data is faded out in the decision process.

SUMMARY

In view of the conventional art, there remains a need for a cost-efficient technique for predictive driving assistance which is improved in its reliability with regard to detection inaccuracies and detection errors.

The above need is satisfied by a method for a prediction subsystem in a driving assistance system of a vehicle. The method comprises the steps of accepting a set of basic environment representations, wherein each basic environment representation represents at least one first entity detected by one or more sensors in an environment of the vehicle; allocating a set of basic confidence estimates, wherein each basic confidence estimate of the set is associated to one of the set of basic environment representations, and each basic confidence estimate represents a combination of one or more detection confidences related to the associated basic environment representation; associating at least one weight to one of the basic confidence estimates, wherein the weight is related to a composite environment representation based on the set of basic environment representations and the weight indicates an effect of a detection error in the basic environment representation, to which the weighted basic confidence estimate is associated to, on a prediction for a second detected entity; calculating a weighted composite confidence estimate for the composite environment representation based on a combination of the set of basic confidence estimates with the associated at least one weight; and providing the weighted composite confidence estimate as input for an evaluation of the prediction based on the composite environment representation.

The vehicle (host-vehicle, ego-vehicle) may be a car, truck, or bus, or in general any object intended for driving on a road, motorway, etc., which may include manned vehicles driven by a driver but also automatically driven vehicles such as robot vehicles. In this respect, the terms 'driver assistance system' and 'driving assistance system' (synonymously used herein) are to be understood as including in general any kind of driving assistance system, which may for example be employed in unmanned vehicles as well.

A driving assistance system may be understood as comprising a prediction subsystem in case of a capability of predicting any kind of future movement and/or other behavior of a moving object.

The detected entities may include any kind of moving or static objects or other structural elements, such as, e.g., lane markings or road areas. For example, moving objects may comprise other vehicles, cars, trucks, busses, motor/cyclists, robotic vehicles, but also trolleys, pedestrians, and even animals such as horses. Static objects may comprise parking vehicles, but also fixed objects such as road signs, traffic lights, road margins, guard railings, walls, trees and bushes, lane markings. The entity to be predicted and referenced as 'second entity' above for clarity may be among the 'first entities' which are represented by basic environment representations.

The host vehicle may host any kind of sensor equipment or circuitry, such as one or more radar systems, one or more cameras, etc. The ego vehicle may host a communication system for receiving data from other cars via Car-2-Car communication, data from road side transceiver stations via short range communication or via a mobile communication system. Also data achieved according to one or more of these ways will be referred to as sensor data for sake of conciseness herein.

The 'environment' or 'vicinity' of the host vehicle may be defined by the range of the one or more sensor systems hosted by the vehicle. For example, the environment may reach as far as a radar system's capability of detecting objects with at least a predefined reliability.

A basic environment representation may represent one or more detected entities in the processing system of the driving assistant, and/or may include a representation of relations of two or more entities with each other. It is to be understood that the term 'basic' is merely used herein to indicate that the referred-to representation is going to be used as an input for a composite environment representation. Consequently, any 'composite' environment representation which results from one or more basic environment representations may be used as a basic environment representation in a subsequent processing.

A single detected entity may be represented in the driving assistance system and therefore is a simple example of an environment representation; for instance, the object may be represented as a structural element, unit, or atom having indications of a position and velocity associated thereto, but potentially also further indications such as structural properties, a geometrical extension, a predefined indicator indicating a type of the entity, etc. A more complex environment representation may comprise implicitly or explicitly two objects and a relation therebetween. For example, a detected object may be represented as a vehicle moving ahead of the ego-vehicle. As another example, two objects may be represented as two vehicles driving on the same lane. As still another example, a vehicle may be represented as being related to a lane.

It is to be understood that a composite environment representation is formed of a predefined set of basic environment representations. According to some embodiments, the required set of basic confidence estimates is allocated by selecting from a plurality of available basic confidence estimates those basic confidence estimates associated to basic environment representations contributing to the composite environment representation desired to be determined.

Vice versa, the system may decide on whether a composite environment representation can or is to be formed on the basis of whether the required set of basic environment representations is available. If yes, the required set of basic environment representations is allocated and the composite environment representation is determined. A prediction can then be determined based on that composite environment representation. The step of allocating may simply comprise a detection or evaluation within the system that all basic confidence estimates of the set are available, e.g. have assigned meaningful values thereto.

The basic environment representations may have basic confidence estimates associated thereto according to a one-to-one relation; however, one-to-many or many-to-one relations can also be contemplated. Again, the term 'basic' is merely intended to indicate that the referred-to confidence estimate as designated is an input for calculating the composite confidence estimate. In other words, a composite confidence estimate may serve as a basic confidence estimate in a subsequent processing.

A detection confidence may represent, as a simple example, one or more sensor confidences that are related to that sensor elements contributing to the detection of objects and/or relations represented in the basic environment representation. For example, an environment representation may represent a moving object detected by a radar system hosted by the ego vehicle, and the associated confidence estimate may represent a confidence value of that radar system, e.g. a value provided by the radar system indicating a reliability of the detection of the moving object, one or more accuracy values indicating an accuracy of a detected position, velocity, etc. of the detected moving object, etc.

In case an entity is detected by multiple sensor systems, a corresponding confidence estimate may comprise one or more confidence values for each of the sensor systems, and/or various confidence values may be processed to result in combined confidence values.

Sensor confidences may comprise indications of signal strength, a signal-to-noise ratio, an error indication derived from an error propagation technique, etc. As another example, detection confidences may also result from plausibility checks.

It is to be understood, that a confidence estimate may be directly used for being associated to an environment representation and/or a prediction thereof, and/or may be used as a basic confidence estimate, i.e. as an input for calculating composite confidence estimates. Therefore, for sake of conciseness, when discussing 'composite confidence estimates' herein these may also include one or more confidence estimates which result directly from detection confidences without being calculated based on other confidence estimates. Similarly, a basic confidence estimate may not necessarily be used as an input for calculating a composite confidence estimate.

Weights may be associated to each of the basic confidence estimates, or a subset thereof including at least one basic confidence estimate. Weights may be represented as simple values, parameters or numbers, which may or may not be predefined, or may comprise more complex expressions, which may be evaluated on run time. As a specific example, weights may be associated with basic/composite confidence estimates in a one-to-one relation. According to another embodiment, one and the same weight value may be associated to multiple confidence estimates, such that weights may be associated with basic/composite confidence estimates in a one-to-many relation.

Further, according to various embodiments, weights can be associated with basic/composite confidence estimates in a many-to-one relation. It is to be understood that a weight may be associated with a basic confidence estimate in view of the composite confidence estimate to be derived therefrom. Therefore, in general a weight may have a value which is not only specific for the associated basic confidence estimate, but which is also specific for the associated composite confidence estimate. Therefore, according to various embodiments a confidence estimate which is used as an input for calculating multiple composite confidence estimates will have multiple weights associated thereto, for example one weight per composite confidence estimate.

Multiple weights for a confidence estimate may be represented in a weight vector. The entirety of weights for a system may be represented in a weight matrix according to each weight being associated to at least one basic confidence estimate and at least one composite confidence estimate. Modification of such generic model can be contemplated by the person of skill.

Specific values for the weights may be predefined, which is to be understood as including embodiments wherein a mathematical formula or algorithm is provided for generating some or all weight values either on startup of the host vehicle, on startup of the driving system, the prediction subsystem thereof, or on demand whenever a weight is required for the calculation of a composite confidence value.

According to various embodiments, a prediction subsystem in a driving assistant may operate to generate one prediction for each entity detected in an environment of the ego vehicle at least if the entity is assumed to be relevant for future active or passive control; e.g. predictions may be provided for moving (or static) objects assumed to be relevant traffic participants. The prediction may be generated based on sensor input, i.e. may be sensor-driven.

Prior to potentially initiating an active or passive control based on the prediction, a reliability of the prediction or prediction hypothesis for the entity may be evaluated based on, e.g., sensor confidences, wherein the reliability may be represented by the confidence estimates associated to the environment representations in the system.

A weight may be associated with a confidence estimate in the system to thereby represent an effect of the confidence estimate on the prediction of a currently predicted traffic participant. An appropriately weighted confidence estimate is a measure which enables an improved assessment of the reliability of the prediction, and therefore an improved active or passive control for supporting, e.g., a driver of the host vehicle. Weights may be assigned to minimize or reduce the probability of a wrong prediction being used as a basis for active or passive control.

Having weights available in the system, various specific strategies may be followed when assigning, e.g., specific values to the weights each associated to particular confidence estimates (which are in turn associated to particular environment representations). A weight may indicate an effect of a detection error on a prediction. For example, a weight may represent an effect of a sensor error/a wrong sensing on the prediction or prediction result.

According to some embodiments, a weight may reflect the influence of wrong sensing, based on one or more sensors, of a detected entity (which may be other than the predicted entity) on the prediction result. For example, weights may represent the effect a wrong sensing of a position, velocity of a detected object on the prediction for another object, or may represent the influence a wrong lane assignment of a detected object could have on the prediction, etc.

According to various embodiments, multiple weights may be associated in a one-to-one relation to multiple basic confidence estimates. The multiple weights may be assigned relative values reflecting the relative importance of the associated basic environment representations for the prediction. For example, for each pair of weights of the multiple weights, one of the pair of weights can be assigned a value which is higher, equal to, or lower than the value of the other of the pair of weights according to the influence of the associated basic environment representation on the prediction being higher, equal to, or lower than the basic environment representation associated to the other of the pair of weights. Relative weights may, for example, be assigned numerical values between 0 and 1.

According to other embodiments, one or more weights may be assigned to basic confidence estimates in a one-to-many relation, for example because the effects of the corresponding basic environment representations are the same.

According to some embodiments, weights may be assigned to reflect the influence of a detection error on the probability of a critical prediction being taken as basis for active or passive control. Critical predictions may be defined according to the specific circumstances according to which the driving assistant is being employed. For example, a critical prediction may comprise at least one of a false positive prediction result or a false negative prediction result.

The terms "weighted composite confidence estimate" and "composite confidence estimate" are occasionally used synonymous herein. The calculation of the composite confidence estimate may comprise forming weighted basic confidence estimates, wherein a combination of the basic confidence estimate with the weight associated thereto is formed, for example as a result of calculating a product thereof, which example is not intended as excluding other or more complex approaches of assigning a weight to a basic confidence estimate such as the confidence estimate being represented as a mathematical formula, e.g. an exponential expression, and the weight being included at one or more positions in the formula, e.g. in an exponent.

The calculation of the composite confidence estimate may comprise forming a combination of the set of basic confidence estimates and/or weighted basic confidence estimates. The combination may include any of a sum of the confidence estimates, a product thereof, finding a minimum or maximum thereof, and/or more complex calculations.

Calculating a summation or product may comprise calculating a weighted summation or weighted product, wherein the weights are to be distinguished from the weights associated to the basic confidence estimates.

As a result of the technique, a weighted composite confidence estimate may be associated to a composite environment representation. The prediction subsystem or another component of the driving assistant may decide on whether or not the composite environment representation is used as a basis for the prediction, e.g. whether the environment representation is activated or suppressed for scene interpretation/prediction. The decision may include comparing a numerical value of the weighted composite confidence estimate with one or more other numerical values. For example, the confidence estimate may be assessed to be above or below a predefined threshold value. Additionally or alternatively, the confidence estimate may be compared with one or more other confidence estimates associated to other environment representations.

The prediction subsystem may be based on the concept of direct and indirect indicators as introduced above and detailed in the EP'060. For example, one or more of the (basic/composite) environment representations may comprise one or more direct and/or indirect indicators. The basic/composite confidence estimates may similarly be represented as 'confidence indicators'. For example, a confidence indicator may comprise a variable intended to indicate a confidence of an associated environment representation. The variable may have further parameters or variables associated therewith, e.g., a pointer to an associated environment representation, e.g., a direct or indirect indicator.

A structure of representation for the confidence indicators may be re-used from and may therefore be similar to that of the direct/indirect indicators. For example, the direct/indirect indicators may each be represented as a pair of variables, the first variable indicating an observable value and the second variable indicating an associated confidence value, respectively, while the confidence indicator may be represented as a pair of at least a first variable indicating a confidence estimate and a second variable, pointer, or real or integer variable representing an index number pointing towards one or more associated environment representations.

According to some embodiments, calculating a confidence estimate related to the environment representation may be based on applying one or more plausibility rules on the environment representation, wherein each plausibility rule comprises a plausible relation between the at least one entity and at least one of another entity and a previous detection of the at least one entity; and providing the confidence estimate as input for a prediction based on the environment representation.

A confidence estimate may not be exclusively determined based on sensor confidence, but may alternatively or additionally represent a result of a plausibility check. For example, the confidence estimate may have been calculated based on at least one plausibility rule.

A plausibility rule may be implemented as an if-condition which returns a binary value representing either true or false when applied to an environment representation. A plausibility rule may relate properties of a target entity and a further detected entity as detected at the same time point, or may relate one or more properties of one and the same target entity at two different time points. The tested relations are suitable in order to arrive, after the application of one or more plausibility rules, at a confidence estimate indicating a level to which a detection of the target entity is plausible, dependent on the true or false results of the applied rules.

It is to be understood that a plausibility rule may not only ask whether the target entity is or is not related in a particular way to another detected entity, e.g. whether the target vehicle is located between two detected lane markings. Instead, rules may ask for relations to virtual or non-detected entities as well; for example, a rule may ask whether there are other entities such as moving or still objects present in the neighborhood of a target vehicle at all. Similarly, a rule may ask whether or not the target entity has been detected in the past.

As used herein, two entities (or one and the same entity at two different time points) may be said to have a 'relation' already if they are merely present, or could be present, in a scene as detected or detectable by the sensor equipment of the host vehicle. For example, the rule 'is another vehicle present' asks for the presence of a simple relation of the type 'there are multiple vehicles in the scene'. Other rules may ask for relations such as distance relations, e.g. the existence of a gap between two entities, velocity relations, e.g., whether one entity approaches another entity, etc.

Accordingly, the resulting confidence estimate does not or not exclusively relate to sensor confidences, but may reflect a plausibility conclusion to which degree at least one currently detected property of a target entity is logically consistent with at least one property of another detected entity and/or a detection of at least one property of the target entity in the past.

Applying a plausibility rule may result in assigning the confidence estimate a predefined value, and/or in increasing/decreasing a value of a confidence estimate by a predefined amount. For example, applying a plausibility rules may result in defining a preliminary confidence estimate as one of setting a predefined value for the preliminary confidence estimate indicating a plausible detection of the environment representation, or setting a predefined value for the preliminary confidence estimate indicating an implausible detection of the environment representation. Application of a further plausibility rule may then result in one of increasing or decreasing a value of the preliminary confidence estimate by a predefined amount.

Calculating a confidence estimate may comprise calculating a combination of the results of applying multiple plausibility rules, wherein the combination comprises at least one of a summation, weighted summation, product, weighted product, and selecting a minimum or maximum of multiple preliminary confidence estimates.

The above-indicated need is further satisfied by a computer program product comprising program code portions for performing the method according to any one of the methods and method aspects outlined above or elsewhere herein, when the computer program product is executed on a computing device, for example one or more electronic processing modules of a vehicle. The computer program product may be stored on a computer readable recording medium, such as a permanent or re-writeable memory within or associated with a computing device or a removable CD-ROM, DVD or USB stick. Additionally or alternatively, the computer program product may be provided for download to a computing device, for example via a data network such as the Internet or a communication line such as a telephone line or wireless link.

The above-indicated need is still further satisfied by a driving assistance system for a vehicle, wherein the driving assistance system includes a prediction subsystem and comprises a component adapted to accept a set of basic environment representations, wherein each basic environment representation represents at least one first entity detected by one or more sensors in an environment of the vehicle; a component adapted to allocate a set of basic confidence estimates, wherein each basic confidence estimate of the set is associated to one of the set of basic environment representations, and each basic confidence estimate represents a combination of one or more detection confidences related to the associated basic environment representation; a component adapted to associate at least one weight to one of the basic confidence estimates, wherein the weight is related to a composite environment representation based on the set of basic environment representations and the weight indicates an effect of a detection error in the basic environment representation, to which the basic confidence estimate is associated to, on a prediction for a second detected entity; a component adapted to calculate a weighted composite confidence estimate for the composite environment representation based on a combination of the set of basic confidence estimates with the associated at least one weight; and a component adapted to provide the weighted composite confidence estimate as input for an evaluation of the prediction based on the composite environment representation.

According to one embodiment, at least some of the weights are predefined and stored in a corresponding storage. Additionally or alternatively, various combinations of basic confidence estimates and corresponding weights can be precalculated and stored in advance, e.g. during manufacture of a vehicle, implementation or update of the driving assistant, etc. Depending on the details of the system application, intermediate or final results for the weighted composite confidence estimate can be precalculated and stored. This may be applicable in particular for confidence estimates based in part or totally on constant sensor confidences only.

According to various embodiments, the driving assistant system as outlined before may be adapted to perform a cruise control functionality, for example an ACC function including a prediction of lane change maneuvers, for example cutting-in or cutting-out maneuvers of vehicles moving in the vicinity of the host vehicle.

The prediction subsystem of the beforementioned system may be adapted to perform a context based prediction and a physical prediction, e.g. according to the EP'060 disclosure.

The system and/or any of the functions described herein may be implemented using individual hardware circuitry, using software and/or firmware functioning in conjunction with a general purpose computer or a programmed microprocessor, using an application specific integrated circuit (ASIC) and/or using one or more digital signal processors (DSPs).

The abovementioned need is further satisfied by a vehicle comprising a system as outlined before or described elsewhere herein.

The invention enables the provision of driving assistants with predictive capabilities which are improved in their reliability despite unavoidable detection inaccuracies and detection errors. The approach of improving confidence estimates by weighting according to detection error consequences provide a basis for more reliable decisions, e.g., whether an environment representation is reliable enough to be selected as a basis for a prediction and resulting active or passive control of a vehicle.

The inventive approach therefore widens the applicability of predictive driving assistants to vehicles with less sensors and/or intermediate or low quality sensor equipment and therefore to cost-efficient solutions.

The approach discussed herein can make use of the general data structure of indicators including confidence values associated to measurable variables as introduced in EP'060, but can also be implemented independent of that structure in any driving assistant with predictive capabilities.

With specific regard to weighting basic confidence estimates, according to the proposed approach assigning proper weights enables active or passive control being based on reliable predictions despite sensor inaccuracies and sensor errors. One reason for this can be seen, amongst others, in that in a properly configured system, with appropriate weights being associated to the basic confidence estimates, a composite environment representation may achieve a low composite confidence in case of few, but important basic environment representations having low confidence estimates and high weights, even if a larger number of environment representations have higher confidence estimates, but low weights, reflecting that these environment representations are less important for a reliable prediction.

From another, complementary view, the system does not only discriminate between those basic environment representations relevant/not relevant for the targeted composite environment representation, namely by taking into account only the relevant environment representations for calculating the composite environment representation. Moreover, the system ranks those basic confidence estimates which in fact are taken into account, namely according to their weights, and in this way achieves a sophisticated composite confidence estimate which enables the system to better decide on the reliability of a result of a prediction or scene interpretation based on the corresponding composite environment representation.

The invention can be implemented at low costs, as no additional sensor equipment is required. The functionality may be implemented, for example, in form of software modules. Various existing implementations of a driver assistance system may then merely require a software update.

BRIEF DESCRIPTION OF THE DRAWINGS

In the following, the invention will further be described with reference to exemplary embodiments illustrated in the figures, in which.

DETAILED DESCRIPTION

Figure 1:
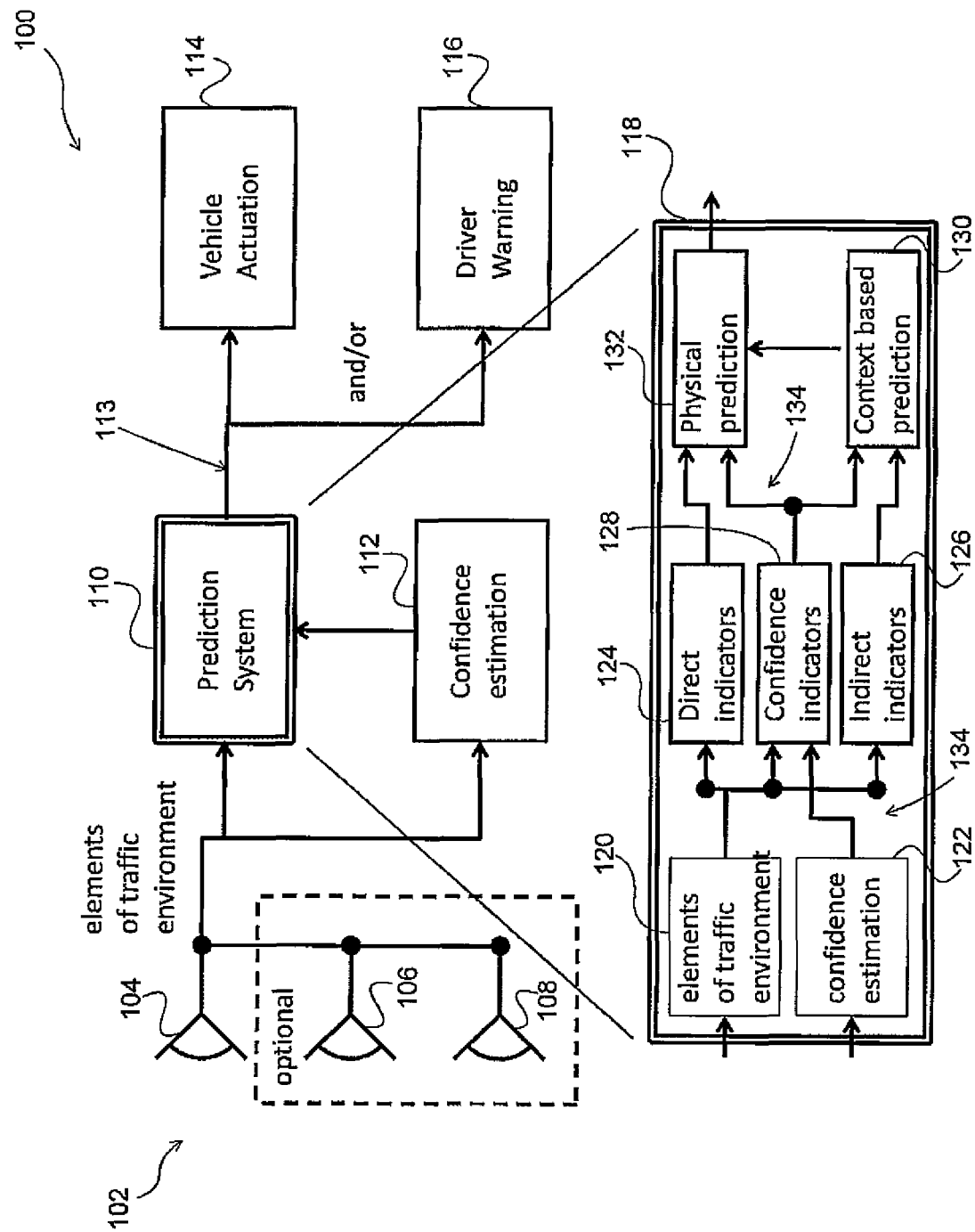
FIG. 1 schematically illustrates on a high level a predictive driving assistant of a vehicle according to an embodiment of the invention.

FIG. 1 illustrates as a high level overview an embodiment of a driving assistant system 100 of a vehicle. The system 100 can be assumed to be implemented on at least one electronic control unit (ECU) of the vehicle and programmed software/firmware functioning thereof. The following discussion will however focus on functional aspects for sake of conciseness and therefore details of hardware/software implementations will mostly be omitted. Further, the figures depict only those components which presently appear to be of relevance for one or more aspects of the invention.

Sensor equipment 102 of the vehicle includes one or more sensor systems 104, 106 and 108, which provide sensor data to a prediction subsystem (PSS) 110 of driving assistant 100. The term 'host vehicle' refers to the vehicle hosting the sensor equipment 102 and driving assistant 100. In case of sensor data received from other vehicles or road-side communication stations such as in a Car2X environment, the sensor equipment is assumed to include a receiver for such data and the term 'host vehicle' is understood herein as including such configuration as well.

Shown separately for clarity is a component 112 which is concerned with confidence estimation (CE) processing and also accepts data from sensor equipment 102, which may include, for example, data related to sensor confidences, such as signal-to-noise (S/N) ratios, signal strength with regard to a detected entity, error indications such as related to error margins, resulting from applied error propagation techniques, etc.

Specifically, sensor data may or may not have a confidence value attached which may be directly derived from the sensor signal. For example, radar sensors may attach a confidence value to each sensed entity, such as a moving or static object, representing a signal strength of a reflected signal. Additionally or alternatively, while not explicitly shown in FIG. 1, sensor confidence data may be the result of sensor data processing in one or more dedicated components associated to at least one of the sensor equipment 102, the assistant system 100, e.g. the CE component 112, and an intermediate processing system.

Confidence estimates provided by CE component 112 are accepted by the PSS component 110, and are further processed as discussed in detail in the following to eventually arrive at one or more predictions regarding a traffic scene as detected by sensor equipment 102 in the vicinity of the host vehicle, and to potentially perform active or passive control operations based on the prediction/s. The predictions may relate to a behavior, such as following a specific trajectory, of each of one or more detected moving objects.

The prediction subsystem 110 operates to predict an evolution of a detected traffic scene wherein the scene may or may not include the host vehicle. Generally, the prediction subsystem 110 takes into account confidence estimates such as attached confidence values; for example, low confidence values reflect that wrong sensing of an environment representation such as (aspects of) a detected entity may have a low influence on the predicted evolution, while large confidence values reflect that wrong sensing of an environment representation may have a larger influence.

Based on the prediction/s evaluated or selected for predicting an evolution, the driving assistant 100 may operate to initiate active control of the host vehicle, such as sending a control signal 113 to a vehicle actuation (VA) component 114. Additionally or alternatively, the assistant 100 may provide the or any signal 113 indicative of the predicted evolution of the detected scene to output systems dedicated to provide information to a driver of the vehicle, subsumed in FIG. 1 by a driver warning (DW) component 116 which may be adapted to control a display, an audio system, etc. of the vehicle for presenting alerts, warning messages, alarm indications, etc. to the driver.

Functional details related to the functioning of the PPS component 110 are depicted by inset 118. The prediction subsystem 110 receives sensor data 120 which may or may not have been pre-processed and will be assumed to be in the form of environment representations representing, for example, detected entities such as vehicles or other moving objects, or static objects such as lane markings or roadside installations, wherein the representation may comprise various data describing a position, a velocity, a geometrical structure or extension, etc.

An environment representation 120 may also include data representing two or more objects, and in this case may generally also include data related to relations between these objects. For example, an environment representation may be related to a first vehicle preceding a second vehicle, and/or the second vehicle approaching the first vehicle. It is noted in this respect that direct and indirect indicators as discussed herein and introduced in the EP'060 can be considered as environment representations.

The prediction subsystem 110 further receives confidence estimates 122 from the CE subsystem, wherein each confidence estimate represents an estimated confidence for the correctness of a sensed traffic environment. A confidence estimate may be based on sensor confidences related to signal strength or error propagation indications, or on plausibility rules. As a result, at least one confidence estimate value is assigned to at least one element of a detected traffic scene. Specifically, one or more environment representations have confidence estimates assigned thereto, wherein the required processing can be performed by the sensor equipment 102, the CE component 112 or the PSS component 110. Specific processing in this regard will be discussed in the following in more detail.

The prediction subsystem 110 further includes components 124, 126, and 128 for constructing direct indicators (DI), indirect indicators (II) and confidence indicators (CI), respectively. The concept of direct and indirect indicators has been discussed already above. Further details can be found in EP'060. The concept of confidence indicators will be discussed below in detail.

The various indicators are input to a physical prediction (PP) component 130 and/or a context based prediction (CBP) component 132, wherein the respective functionality has also been discussed further above and details are given in EP'060.

It is noted that arrows 134 are exemplarily drawn in FIG. 1 and other or further data delivery/acceptance mechanisms may be in place depending on the details of any specific implementation.

Generally, a predictive driving assistant system based on context based prediction and physical prediction can be expanded according to the configuration of FIG. 1 by a confidence estimation functionality that attaches a confidence value to at least one of the sensed entities in a traffic scene as detected by the host vehicle. Further, direct and indirect indicators can be complemented by confidence indicators that are derived from confidence estimations and that combine confidence estimates of those and only those detected entities that are relevant for the composite environment representation the evolution of which is to be predicted.

A confidence indicator may be calculated based on a combination function as described below, according to which, for example, multiple confidence estimates may be weighted and appropriately combined such that the impact of a wrong estimation on the prediction is reflected in the combined confidence value.

One or more confidence indicators may then be input to one or both of the context based prediction and the physical prediction. Additionally or alternatively, a confidence indicator may be combined according to an appropriate combination operation with an output confidence estimate or probability for a predicted behavior.

Figure 2:
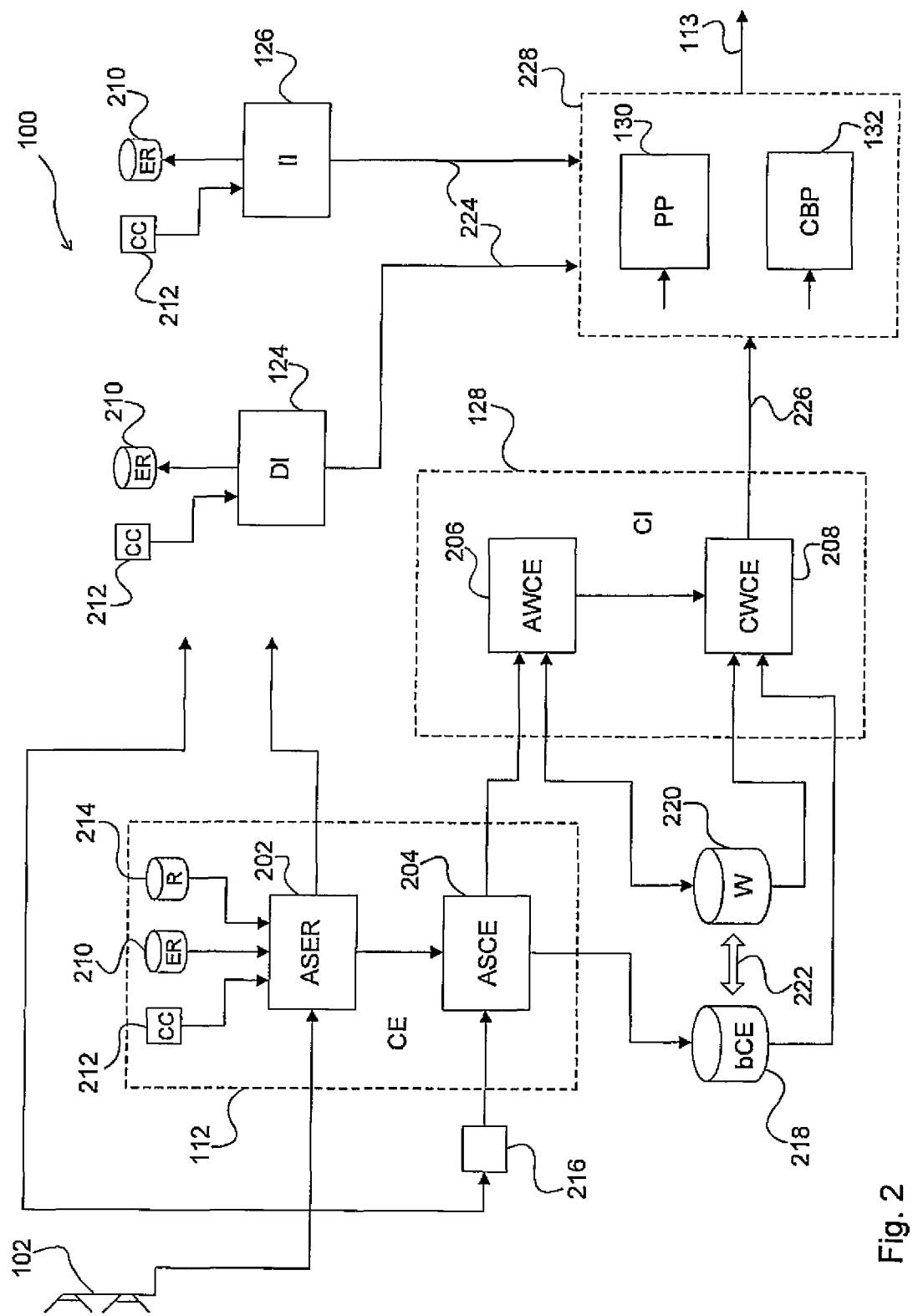
FIG. 2 illustrates functional components of a specific implementation of the driving assistant of FIG. 1.

FIG. 2 illustrates a specific implementation of the driving assistant 100 of FIG. 1, wherein reference numerals are re-used as applicable for clarity. It is to be noted, however, that many other configurations departing from that discussed below with reference to FIG. 2 could be considered depending on details such as desired driving assistant functions, available hardware platforms for the ECU, etc.

The confidence estimator 112 is illustrated in FIG. 2 as comprising a component 202 for accepting a set of basic environment representations (ASER) and a component 204 for allocating a set of basic confidence estimates (ASCE). The CC component 128 for calculating confidence indicators is shown to comprise a component 206 for associating weight to basic confidence estimates (AWCE), and a component 208 for calculating weighted composite confidence estimates (CWCE).

Figure 3:
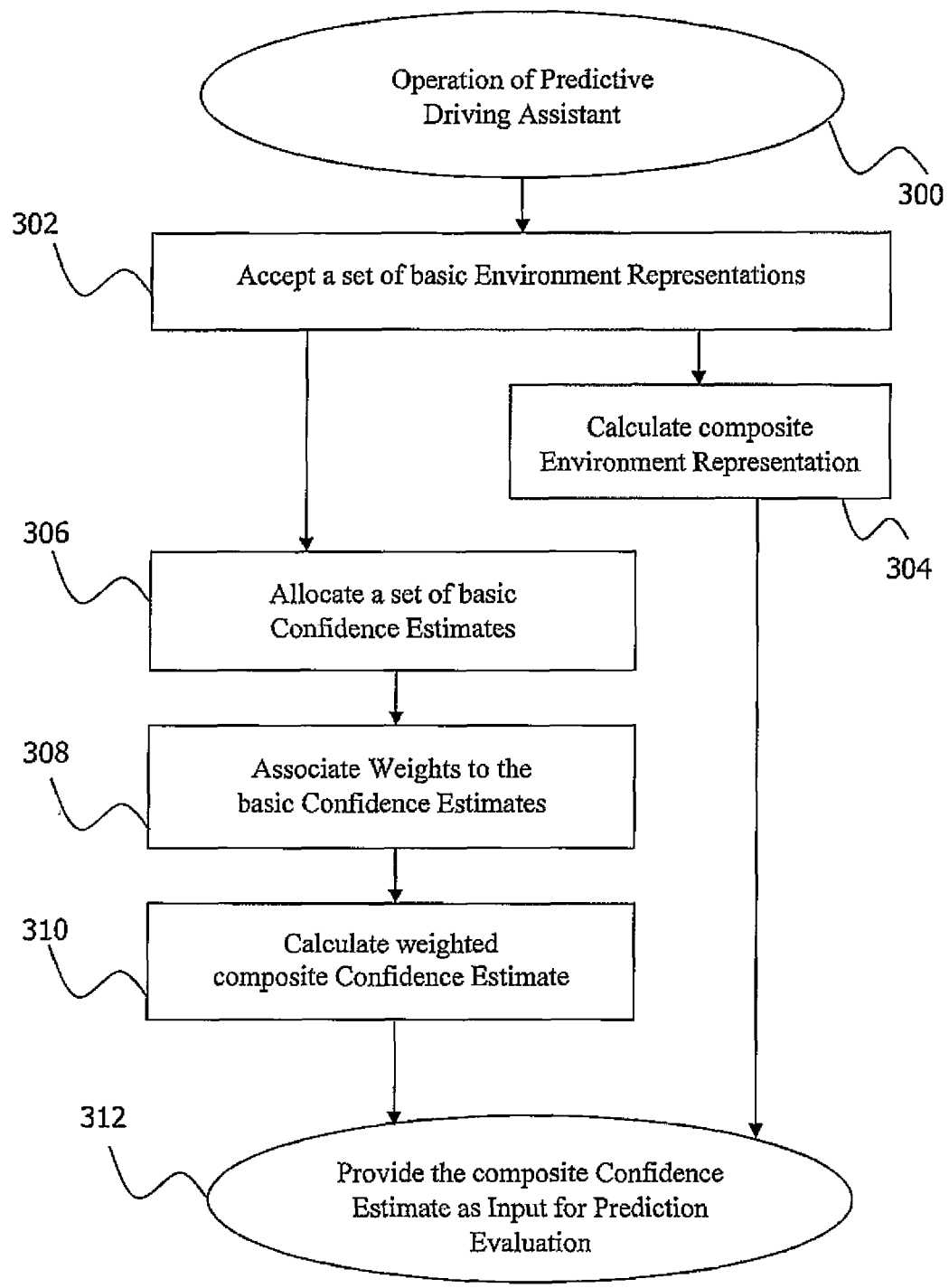
FIG. 3 is a flow diagram illustrating an operation of the driving assistant of FIG. 2.

An operation 300 of the assistant 100 of FIG. 2 will be described with reference to the flow diagram in FIG. 3. In step 302, component 202 of confidence estimator 112 accepts a set of basic environment representations 120. Each basic environment representation represents at least one entity detected by one or more of the sensors 104, 106 and 108 in an environment of the vehicle.

Environment representations may be stored in a storage component or area 210. The component 202 may retrieve the basic environment representations from storage 210 or may operate to generate a set of pointers pointing to storage positions of the representations in storage 210. Information regarding which of a potentially large number of representations belong to the required set may be received from a control component (CC) 212. For example, the set of basic environment representations may group those environment representations required for calculating a particular composite environment representation, for example for calculating a particular direct or indirect indicator.

Which representations belong to a set may be predefined and may be stored in a repository (R) 214 correspondingly. For example, indications on which environment representations, such as detected entities, contribute to any specific direct, indirect, or confidence indicator may be stored in repository 214. In this respect, the component 202 may also simply be triggered by the control component 212 to access repository 214 for retrieving an indication of the set of basic environment representations to be accepted and provide the indication in a workspace.

It is assumed for the operation of component 202 that all required basic environment representations are available. Environment representations may be generated, for example, by components 124, 126 and 128 devoted to generation of indicators. Environment representations, e.g., other than the direct, indirect, and confidence indicators discussed in the EP'060 and herein may further be generated based on data received from the sensor equipment 102, for example representations of single detected entities. Using these as basic environment representations, more complex, composite environment representations may be generated.

In step 304, a composite environment representation is generated based on the provided set of basic environment representations. For example, a direct or indirect indicator may be calculated by one of the DI component 124 or II component 126. Step 304 may be triggered by control component 212 which is depicted various times in FIG. 2 merely for reasons of clarity. Details of the calculation of direct and indirect indicators are described in EP'060. The resultant composite environment representation or an indication thereof may be provided to storage 210, which is also reproduced various times in FIG. 2 for reasons of clarity of the figure. It is noted that step 304 may be performed before, in parallel to, or after one or more of the steps 306, 308 and 310 which may be concerned with, for example, the calculation of a confidence indicator.

In step 306, component 204 operates to allocate a set of basic confidence estimates. Each basic confidence estimate of the set is associated to one of the set of basic environment representations accepted by component 202. For example, component 204 may be triggered by component 202 and may receive an indication of the set of basic environment representations therefrom. Alternatively, control component 212 may trigger both components 202 and 204, which is why steps 302 and 306 may in general also be performed in parallel, although shown in sequence in FIG. 3. Still other options for triggering action of component 204 can be contemplated; for example, component 204 may merely receive a trigger signal from CC component 212 or component 204 to access repository 214 for retrieving information of the required set of basic confidence estimates.

Generally, each basic confidence estimate represents a combination of one or more detection confidences related to the associated basic environment representation. The detection confidence may comprise one or more sensor confidences. In this respect, component 204 may accept indications of sensor confidences from a component 216 dedicated to generate such indications based on, e.g., S/N ratios, etc. as provided by the sensor equipment 102. Other sensor confidences based on, e.g., error margins, may be calculated on the basis of received sensor data. Still other sensor confidences may be provided by the component 216 or otherwise based on predefined data regarding known confidence levels for particular sensor systems, etc.

Detection confidences may include other or further confidence indications apart from only sensor confidences. As an example, plausibility rules may be applied to detection events such as entity detections.

The combination operation to be performed to achieve a basic confidence estimate based on multiple detection confidences may be any of a summation, weighted summation, product, weighted product, selection of a minimum or maximum, combinations thereof, etc. As an example, a confidence estimate may represent an appropriately defined average of multiple sensor confidences.

Component 204 may provide the allocated set of basic confidence estimates in a storage 218, as illustrated in FIG. 2. As a specific example, in case the storage component 218 generally serves for storing confidence estimates, the component 204 when allocating the required set of basic confidence estimates may merely generate a pointer or set of pointers pointing towards the confidence estimates as stored in storage 218.

The confidence estimation 122 in FIG. 1 as based on, for example, sensor confidences and operating to provide confidence estimates for the calculation 128 of confidence indicators is finished with step 306. It is however repeated that arrows 134 in FIG. 1 represent only a subset of the potential relationships of the various functional blocks of the prediction subsystem 100. As an example, the confidence estimation 122 may also comprise allocating a set of confidence estimates for environment representations including indicators such as direct, indirect, or confidence indicators. The 'basic' confidence estimates allocated in such cases comprise 'composite' confidence estimates derived in previous runs of the prediction subsystem 100, i.e. the operation 300 described here may generally be consecutively performed to arrive, starting from simple environment representations and confidence estimates, at more complex environment representations and confidence estimates.

With step 308, control is handed over to component 128 indicated with dashed lines in FIG. 2. Specifically, component 206 may receive a trigger signal, for example, from component 204, another component of confidence estimator 112, or the control component 212. The trigger signal may comprise, e.g., an indication of the set of basic confidence estimates provided in storage 218. In response to the trigger, component 206 operates to associate weights to each one of the set of basic confidence estimates stored or indicated in storage 218.

Each weight is associated to at least one particular basic environment representation; vice versa, each of one or more environment representations which are used as basic environment representations for forming a composite environment representation has associated a weight thereto explicitly or at least implicitly. For example, weights may be normalized such that an average weight is 1 in case of multiplications (e.g., with the associated confidence estimates) or 0 in case of summations (e.g., of the weights), such that confidence estimates which have assigned an average weight do not need any explicitly assigned weighting factor, while any confidence estimate to be weighted deviating from the average may have a weight value explicitly assigned thereto.

Each weight is intended to represent an effect of a detection error, e.g, a wrong sensing, on a prediction based on a composite environment representation. Therefore, while a weight is assigned to a particular confidence estimate/environment representation, that particular basic confidence estimate can have multiple weights associated thereto, namely one specific weight value for each use of the confidence estimate as a basic confidence estimate for different composite confidence estimates.

While in principle a weight is associated specifically to a particular confidence estimate, in practical implementations one weight with a given value may be associated to groups of confidence estimates, e.g. because the influence of detection errors on one or more predictions is considered similar for that group.

Selecting appropriate values for the weights may generally reflect knowledge which is input by human, and therefore weights and/or a formula or formulas (mathematical expressions, algorithmic expressions) for generating weights may be input to the system during at least one of a manufacture of a vehicle or an ECU, an update thereof during an inspection, etc. However, this does not exclude generating weights on the basis of other weights, for example generating weights associated to complex confidence estimates/environment representations based on weights associated to simple confidence estimates/environment representations. Weights may also be adapted during operation, e.g. based on driver feedback to active or passive control actions of the driving assistant.

Component 206 is illustrated in FIG. 2 as providing the set of weights in a storage component 220. For example, storage 220 may store all weights used in the system, or indications thereof, and component 206 may have generated a pointer or pointers to that weights stored in storage 220 which belong to the set of weights currently under processing. As a result of steps 306 and 308, and as indicated by dashed arrow 222, in general there is a one-to-one relation between allocated basic confidence estimates in storage 218 and associated weights in storage 220. Exceptions may comprise that some confidence estimates, groups thereof, etc. may have average or neutral weight and therefore need not have explicitly assigned a weight thereto.

In step 310, component 208 operates to calculate a weighted composite confidence estimate for the composite environment representation calculated in step 304. The calculation is performed on the basis of the set of relevant basic confidence estimates indicated in storage 218 and the associated weights indicated in storage 220. A combination of the confidence estimates and associated weights is performed, which may comprise at least one of a summation, multiplication, weighted summation, weighted multiplication, more complex operations such as calculation of averages, determination of minimum or maximum values, etc. The weights may each be combined with the associated confidence estimates before calculating the composite confidence estimate, and/or the weights and the confidence estimates may be processed separately, for example one or both of the confidence estimates and the weights may be re-normalized before being combined with the confidence estimates.

The calculated weighted composite confidence estimate may be stored, or an indication thereof may be stored, in the storage 218. The confidence estimate may itself be used as a basic confidence estimate in subsequent processing, e.g. in a subsequent execution of operation 300 for calculating an even more complex composite confidence estimate.

In step 312 the weighted composite confidence estimate is used as input for an evaluation of a prediction based on the composite environment representation. For example, the composite environment representation may comprise a direct or indirect indicator, which is input to one of the physical prediction subsystem 130 and the context based prediction subsystem 132 as indicated by arrows 224 in FIG. 2. The composite confidence estimate may comprise an associated confidence indicator which is correspondingly provided by the subsystem 128 to one of the PP 130 and CBP 132 subsystem, as indicated by arrow 226. As discussed before, despite arrows 224 and 226 indicating a direct functional relationship, the composite environment representation of step 304 and the composite confidence estimate of step 310 may be stored in storage 210 and repository 218, respectively, and may be retrieved therefrom by one or both of the PP 130 or CBP 132 component in response to a trigger such as signals 224, 226, and/or other signals such as a signal received from control component 212.

One or both of the PP subsystem 130 and the CBP system 132 may accept the confidence indicator indicated by signal 226 either by using the confidence indicator in subsystem-internal calculation, or by modulating a subsystem output accordingly. More specifically, the context based prediction may incorporate a confidence indicator by concatenating it with another in/direct indicator into one feature vector and feeding the feature vector to a classifier. Additionally or alternatively, a value of the confidence indicator can be appropriately combined with the probability assigned to a predicted behavior, wherein the combination operation may comprise at least one of a summation, weighted summation, a product, a weighted product, minimum or maximum selection, etc.

A confidence indicator may be input to the physical prediction for example by performing an appropriate combination operation with likelihood values or a validator function of the PP subsystem 130, wherein the validator function is described in more detail in EP'060. Additionally or alternatively, a value of the confidence indicator can be appropriately combined with a final posterior probability, wherein the combination operation may comprise at least one of a summation, weighted summation, a product, a weighted product, minimum or maximum selection, etc.

A component of the prediction and decision subsystem 228 may decide, based on the weighted confidence estimate, whether the corresponding (composite) environment representation will be relied upon for a prediction of the further behavior of a detected moving entity. For example, the weighted confidence estimate may comprise a numerical value, which is evaluated and, if for example found to be above a certain value, the environment representation is activated and a prediction resulting from the environment representation may form the basis for a control operation, while if the weighted confidence estimate is found to be below the certain value, the environment representation is suppressed to be used as the basis for a prediction and a potentially resulting control operation.

If the composite environment representation is found to be reliable based on the weighted confidence estimate, the resulting prediction may lead to control signal 113 as depicted in FIG. 2. Thereafter, control may be returned to a higher control level.

Operation 300 of the prediction subsystem 100 may be re-initiated for providing further environment representations and/or confidence estimates, e.g. for providing further direct or indirect indicators and/or confidence indicators. For a comprehensive scene interpretation, a plurality of executions 300 will generally be required depending on complexity of the driving assistant functionality, the traffic scene, e.g., the number of detected relevant entities, etc. Further, predictions and corresponding control signals will have to be refreshed on a regular, e.g., periodical or cyclical basis, and/or in response to the acceptance of new sensor data, etc.

While the data processing has been described with reference to FIGS. 1-3 as being performed in real-time, portions of the data processing may be performed and stored in advance, e.g. during manufacture. For example, at least some basic confidence estimates could be pre-calculated if based, e.g., on constant sensor confidences. Calculations related to weights could be performed in advance in case of constant or pre-defined weights, for example combination operations for weights to be input into the calculation of the weighted composite confidence estimate. Also, calculations related to combinations of fixed confidence estimates and weights could be performed once and the results be stored for use during in-field-operation of the vehicle and the driving assistance system.

Figure 4:
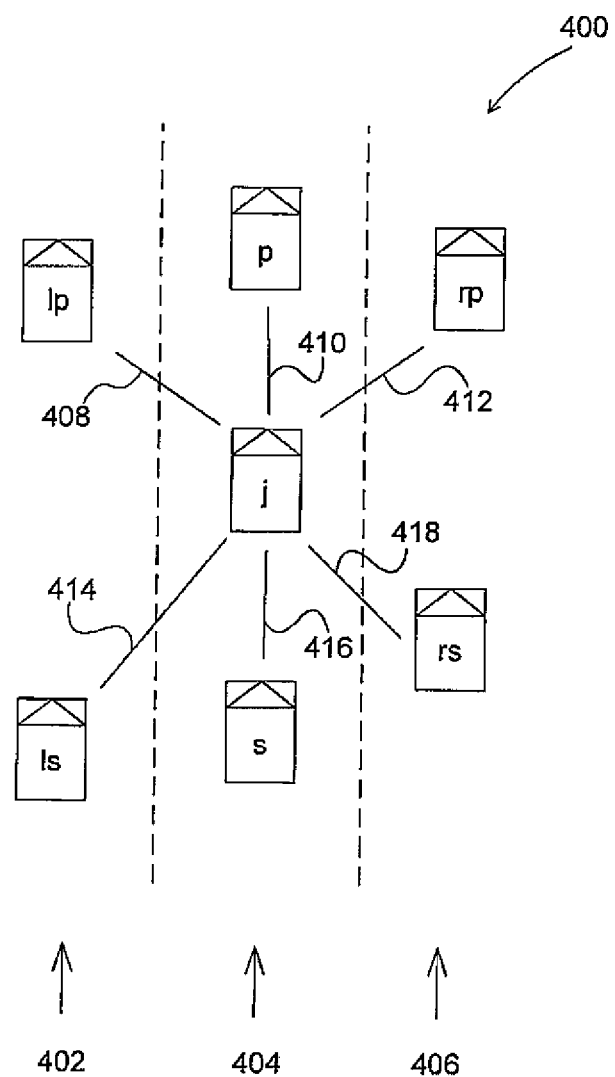
FIG. 4 shows a first exemplary traffic scene for reference purposes.

FIG. 4 illustrates for purposes of later reference a traffic scene as may be detected by a host vehicle of the driving assistant system 100 discussed in the previous figures. The host vehicle itself may or may not be part of the scene. On a road 400 with lanes 402, 404, 406, a target vehicle j, which may be different from the host vehicle, moves on lane 404. The prediction system may have to decide on whether to predict a lane change of target vehicle j, for example a cutting-in to lane 402. Various environment representations may be generated and may have assigned confidence estimates in order to provide the basis for one or more reliable predictions and corresponding control operations.

The environment representations may represent relations of target vehicle j to other moving objects, e.g. vehicles, wherein letter 'p' may designate a predecessor of the target vehicle, letter 's' a successor of the target vehicle, letter 'l' may designate an object on a lane left to the target vehicle, and letter 'r' may designate an object on a lane right to the target vehicle. Consequently, target vehicle j potentially may have relations 408 and 414 to vehicles lp and ls, respectively, on lane 402 left to the target vehicle's lane 404, relations 412 and 418 to vehicles rp and rs, respectively, on lane 406 right to the target vehicle's lane 404, and/or relations 410 and 416 to vehicles p and s, respectively, on the same lane 404.

Any traffic scene in which the target vehicle is involved may comprise all or some of the further vehicles depicted in FIG. 4, and consequently only a subset of the relations 408-418 may have to be represented by the system and/or evaluated.

Figure 5:
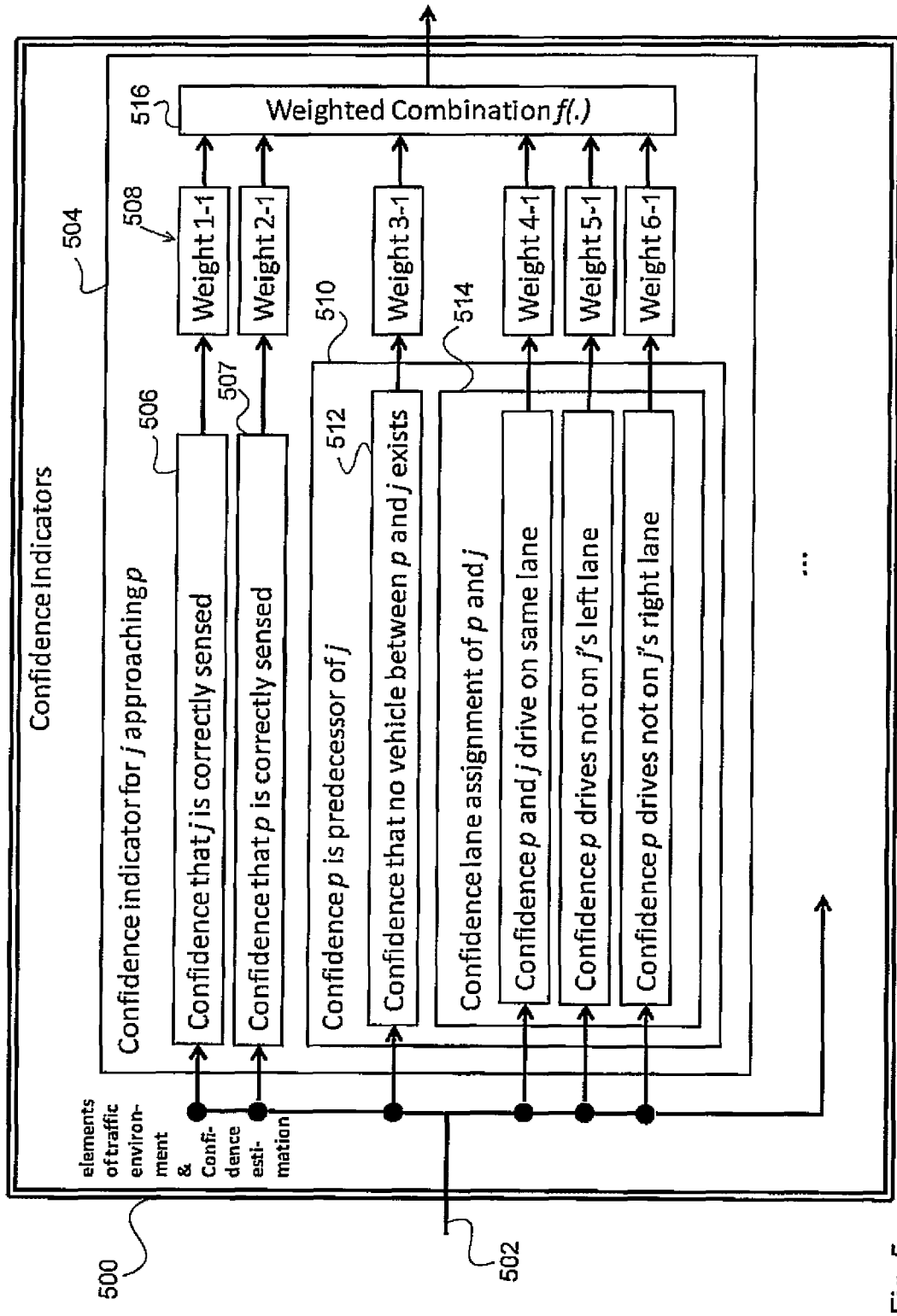
FIG. 5 schematically illustrates a calculation of a first embodiment of a confidence indicator according to the invention.

FIG. 5 schematically illustrates the calculation of a plurality 500 of composite confidence indicators each based on a specific set of prescriptions. Each set may be implemented in system 100 and controlled by control component 212 of FIG. 2. The prescriptions refer to other basic confidence estimates, including other confidence indicators, which may itself be defined in list 500. As can be inferred from FIG. 1, the input 502 to generating confidence estimators comprises environment representations 120 as well as confidence estimates 122.

The generation of one particular confidence estimate 504 is illustrated in more detail in FIG. 5, namely of a confidence indicator for an approaching predecessor. In more detail and with reference to the nomenclature of FIG. 4, the confidence indicator 504 is related to the target vehicle j approaching its preceding vehicle p. The indicator 504 may be applied once for each of a plurality of target vehicles, i.e. in case a traffic scene comprises various vehicles, various instances of indicator 504 may be defined. Data related to each instance of indicator 504 may be stored for example with reference to an internal ID number of each target vehicle.

The input to confidence indicator 504 may comprise confidences 506, 507 that moving object j is correctly sensed, and that moving object p is correctly sensed. For sake of discussion it is assumed that each of the confidence estimates 506, 507 represents a combination of sensor confidences, for example a combination of a sensor confidence for object j being sensed at all, a sensor confidence for object j being sensed as one entity instead of two or more separate and independent entities, a sensor confidence for object j being sensed with correct position, a sensor confidence for object j being sensed with correct velocity, etc. The term 'correct' may be understood here as restricting the sensing results to be within error margins allowing reliable predictions.

Relative weights 508 are assigned to the confidence estimates, i.e. Weight 1-1 and Weight 2-1 are assigned to each of confidence estimates 506 and 507. Each of the weights 508 reflects the effect of a detection error, e.g. one or more sensor errors, in relative terms to a prediction based on the composite environment representation "j aproaching p", to which the weighted composite confidence indicator 504 is associated to. With regard to confidence estimates 506 and 507, Weight 1-1 and Weight 2-1 may have identical values, as a wrong sensing of position, velocity, and/or acceleration of j or p can be assumed to have equal or similar influence on prediction/s resulting from "j approaching p". As an example, a lane change of j may (wrongly) be predicted.

It is exemplarily assumed for the sake of discussion that as a further input to confidence indicator 504 a confidence estimate, namely another confidence indicator 510, is required, which indicates a confidence for p being in fact a predecessor of j. Confidence indicator 510 in turn involves as a further confidence estimate 512 the confidence that no further vehicle exists between p and j. Weight 3-1 is assigned thereto which may have a lower value compared to Weight 1-1 and Weight 2-1, because it can be assumed that j changes lane in any case if p is slower than j, even if a vehicle between j and p exists which is not detected by the sensor equipment of the host vehicle.

Confidence indicator 510 may involve as a further confidence estimate the confidence 514 of correct lane assignment to both p and j. That confidence estimate is illustrated as still further resulting from a combination of confidences that p and j drive in fact on the same lane, that p drives not on the lane left to j, and that p drives not on the lane right to j. Further confidences can be contemplated to contribute to estimate 514.

Weight 4-1, Weight 5-1, and Weight 6-1 are assigned to the confidence estimate 514 to reflect the influence of errors in the sensing result that p and j in fact drive on the same lane. Specifically, the weights are intended to represent the influence of a wrong lane assignment on prediction results based upon "j approaching p". A wrong assignment of the vehicle p to the lane of j, although p being in fact on j's left neighboring lane, may not lead to a false cut-in prediction, for example, because vehicles on the left lane can be assumed to be typically faster than vehicles on the right lanes. A wrong assignment of vehicle p to the lane of j, although p is moving in fact on the lane right to j, may lead to a wrong prediction with severe consequences, because a vehicle on the right lane may be assumed to be slower than j. Therefore, a higher value may be selected for Weight 6-1 than for Weight 4-1 and Weight 5-1.

Further confidences can be contemplated to contribute to confidence estimates 506, 510, 514, etc. A combination f(.) 516 is calculated from the various basic confidence estimates and the weights assigned thereto in order to achieve the weighted composite confidence estimate 504. The combination 516 may comprise a summation, a product, minimum or maximum selection, combinations of these, etc. It is noted that the combination function f may comprise further weights over that depicted in FIG. 5 as part of the combination operation.

Figure 6:
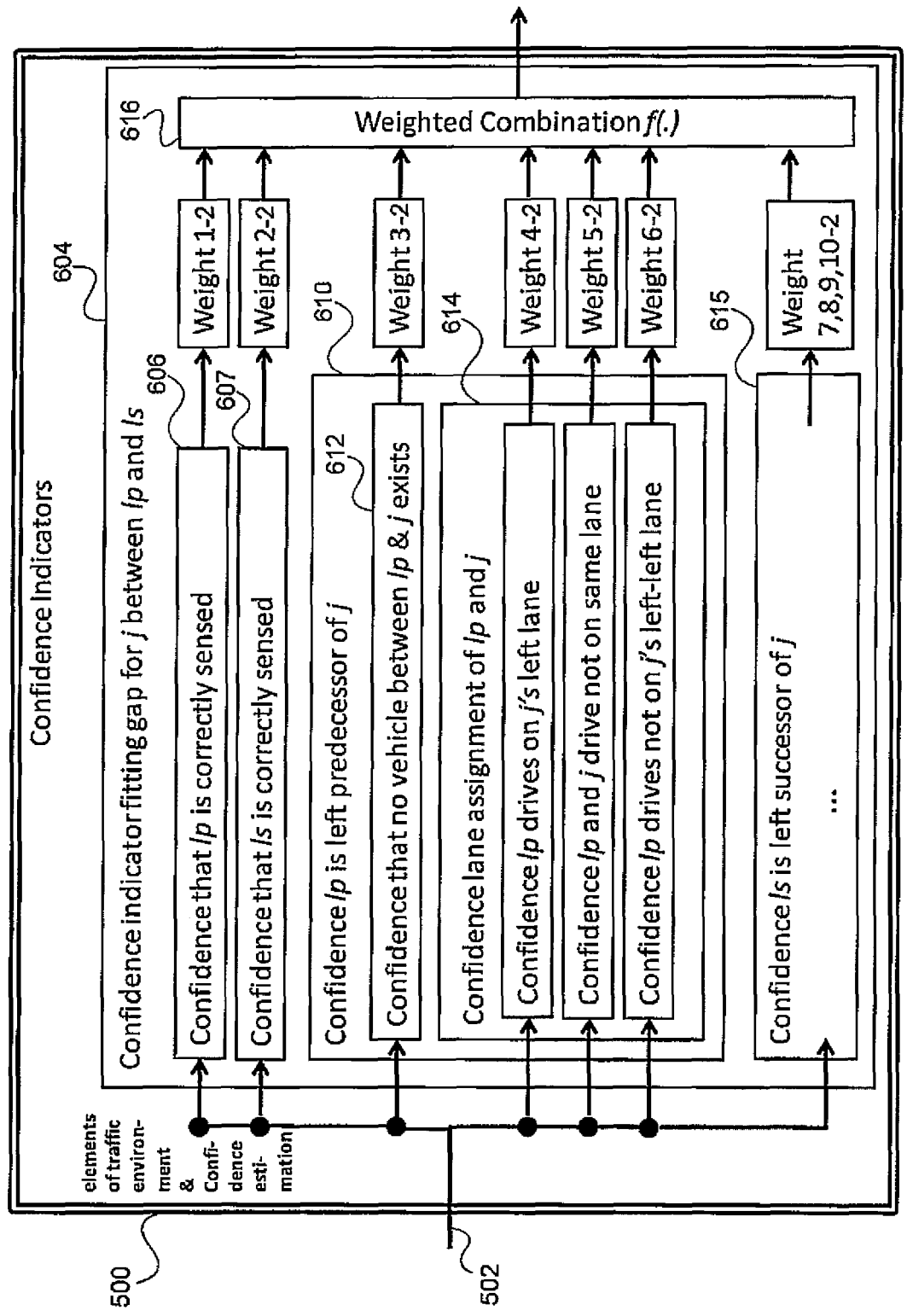
FIG. 6 schematically illustrates a calculation of a second embodiment of a confidence indicator according to the invention.

FIG. 6 illustrates another composite confidence estimate 602 of the set of confidence estimates 500. Confidence estimate 602 is assumed to be a confidence indicator related to a fitting gap for j between lp and ls on the lane left to vehicle j, see FIG. 4.

Similar to indicator 504 of FIG. 5, indicator 602 is again based upon further nested confidence estimates. For reasons of discussion, confidence estimates/indicators 606, 610, 612 etc. are illustrated as contributing to indicator 602 which have similarities to confidence estimates 506, 510, 512, etc. in that they relate to similar object relations and they may be prone to similar detection errors. However, despite these similarities, the detection errors may differ in their effects on the reliability of the resulting prediction. In principle, even weights associated to one and the same confidence estimate may differ if the confidence estimate is used as an input (i.e. a basic confidence estimate) for different composite confidence estimates. Therefore, the values of Weight 1-2, 2-2, etc. as depicted in FIG. 6 may be selected different from the values of Weight 1-1, 2-1, etc. of FIG. 5, as discussed in the following.

Confidence indicator 604 may have as an input a further confidence indicator 610 indicating a confidence for lp being left predecessor of j. Confidence indicator 610 in turn may involve as a further confidence estimate 612 a confidence that no further vehicle exists between lp and j, and for the computation of the composite indicator 604, a Weight 3-2 is assigned thereto. Although confidence estimates 512 and 612 relate to similar relationships, Weight 3-1 of FIG. 5 and Weight 3-2 of FIG. 6 may have assigned different values. The reason is that in case of indicator 604 the presence of another vehicle between lp and j might effectively close a gap between ls and lp and any misdetection in this regard therefore could have a strong influence on a prediction based on the corresponding environment representation 604.

Confidence indicator 604 is illustrated as further requiring input of a confidence estimate 615 related to ls being a left successor of j. Estimate 615 may be nested in a way similar to estimate 610. Weight 7-2, Weight 8-2, Weight 9-2 and Weight 10-2 may have similar values assigned as Weight 3-2, Weight 4-2, Weight 5-2 and Weight 6-2. However, one or more of Weight 7-2, Weight 8-2, Weight 9-2 and Weight 10-2 may have assigned a value larger than that of the corresponding Weight 3-2, Weight 4-2, Weight 5-2 and Weight 6-2, respectively, because a left successor, in comparison to a left predecessor, may typically have a stronger influence on the intention of a driver to perform a lane change.

While FIGS. 5 and 6 illustrate performing a combination of confidence estimates and weights within one operation 516 and 616, respectively, according to other embodiments, parts of the calculation may be performed at different instances and the operations 516, 616 may comprise combining pre-calculated intermediate results. For example, a combination of confidence estimates and weights may be performed when calculating the confidence indicator 510, including combining confidence estimates 510 and 512 and including weights Weight 3-1 to Weight 6-1. An intermediate result thereof may then be provided to the operation 516 when calculating the confidence indicator 504.

Weights associated to confidence estimates may have assigned values which reflect a probability for a wrong perception resulting in a critical prediction outcome, i.e. active or passive control operation. For example, according to various embodiments wrong predictions and erroneous control operations may be assessed as being more or less critical.

As an example, a driving assistant may be implemented in a manned vehicle for assisting a human driver. The human driver may be assumed to drive generally without errors, with rare exceptions. The driving assistant may generate false positive prediction results, which may include for example passive control operations such as warnings or active control operations such as braking operations, although there is no factual reason for that. False positive predictions may annoy the driver and may lead to the driver switching the system off. This in turn prevents the system from supporting the driver in the rare situations where human driving errors occur, and for that reason false positive prediction results may be assumed critical system errors.

The driving assistant may also generate false negative prediction results, which may include for example failure to generate passive or active control operations, although there would be a factual reason for generating such operations. False negative results may be assumed to be absorbed by driver intervention as the driver will normally be able to handle the situation. Therefore false negative prediction results may be assumed to be less critical system errors.

As an alternative example, a driving assistant may be implemented in an unmanned or autonomous vehicle, i.e. vehicle control is required to handle all driving situations autonomously. Within this framework, a false positive prediction result may be assumed less critical. For example, the driving assistant may be implemented such that an operation thereof based on occasional false positive prediction errors may be considered as overcautious driving.

On the other hand, false negative prediction results may be considered critical, as the autonomous vehicle may then generate accidents.

In the following, a specific example of a driver assistant, i.e. a driving assistant system for assisting a human driver, is assumed wherein false positive results are assessed more critical than false negative results. Referring to the confidence indicator 504 of FIG. 5, the weights may be specifically assigned numerical values as follows: Weight 1-1=1; Weight 2-1=1; Weight 3-1=0.5; Weight 4-1=1; Weight 5-1=0.5; Weight 6-1=2. The weighted combination 516 may be calculated as the sum of (weight_i)*(confidence indicator_i) over all i from i=1_1 to 6_1.

For sake of discussion, it is assumed that the weighted confidence 516 may be directly used to suppress the indirect indicator "j approaching p" by multiplication.

Figure 7:
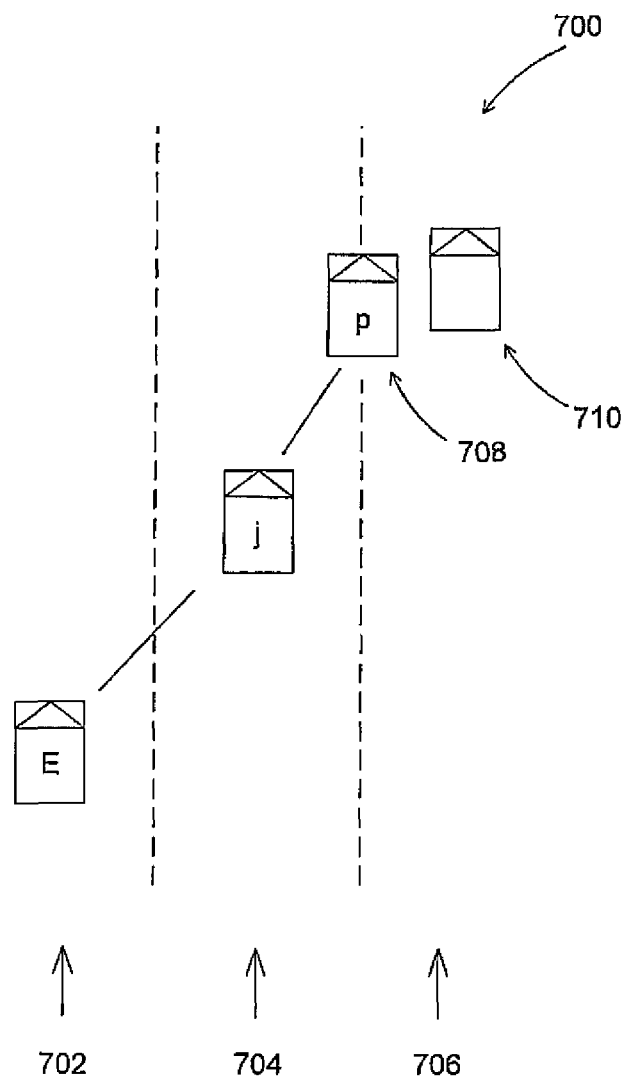
FIG. 7 shows a second exemplary traffic scene for reference purposes.

FIG. 7 depicts an exemplary traffic scene as may be detected by the above-described exemplary driver assistant. On a road 700 with lanes 702, 704, 706, ego vehicle E detects a target vehicle j as well as a predecessor vehicle p. The prediction system may for example have to decide on the reliability of a prediction of a lane change of target vehicle j from lane 704 to ego lane 702, i.e. a cutting-in to lane 702, which prediction may be based on the indirect indicator "j approaching p".

For sake of discussion it is assumed that vehicle p has wrongly been perceived in position 708, i.e. as driving on lane 704, while its actual position 710 is on lane 706. Velocities of vehicles j and p may have been measured as 100 kilometers per hour and 60 kilometers per hour, respectively. As the velocity difference may be above a respective threshold, the indicator "j approaching p" might react (e.g. in a driving assistant without weights), which in turn might lead to a wrong prediction, e.g. a prediction of an upcoming cutting-in of vehicle j to lane 702, and further in turn to a wrong prediction result such as a braking operation of the ego vehicle E initiated by the driver assistant, which would however be a false positive prediction result.

Referring to the confidence indicators 506 and 507 of FIG. 5, it is assumed that vehicles j and p can be sensed relatively accurately, such that confidence indicators $c1\_1$ (516)=0.8 and $c2\_1$=0.8. Further, j and p are detected close to each other and the system is confident that there is no undetected vehicle in between j and p, resulting in confidence indicator $c3\_1$ (512)=1.0. Still further, the vehicle p is perceived as driving in position 708 between lane 704 where vehicle j drives, and lane 706, wherein the corresponding confidence values (514) $c4\_1$=0.5, $c5\_1$=1.0 and $c6\_1$=0.5.

The weighted composite confidence estimate 516 of FIG. 5 would result in a numerical value of 0.68, which is to be compared to a numerical value of 0.77 for a system without weights (i.e. all weights are chosen=1.0). Assuming the weighted composite confidence estimate being multiplied with the activation of the indicator "j approaching p", the individual weighting would therefore reduce the probability of a wrong prediction significantly compared to no weighting (i.e. all weights=1.0). In other words, the weights set individually as discussed above lead to the confidence or reliability estimation for the indicator "j approaching p" being reduced in the critical situation depicted in FIG. 7, and therefore support avoiding false positive prediction results.

Specific combinations of weight settings may be adapted to avoid or absorb false positive prediction results for specific traffic situations, as exemplarily described above. For other situations the specific setting may even lead to increased weighted confidence estimates, which would be irrelevant, however, as long as in such situations the associated environment representation, e.g. indicator, would not react anyway. Therefore, when implementing appropriate weight settings, the person of skill may focus on those situations in which an environment representation, e.g. an indicator, would in fact trigger a prediction with corresponding control operation.

The invention may be implemented with any kind of predictive driving assistant, which includes besides cruise control many more functions such as even parking assistants, and which includes assistant functionalities to be developed in the future.

While the invention has been described in relation to its preferred embodiments, it is to be understood that this description is intended non-limiting and for illustrative purposes only. In particular, various combinations of features wherein the features have been described separately hereinbefore are apparent as advantageous or appropriate to the skilled artisan. Accordingly, it is intended that the invention be limited only by the scope of the claims appended hereto.

The invention claimed is:

1. A method for a prediction subsystem in a driving assistance system of a vehicle, the method comprising the following steps:
    accepting a set of basic environment representations, wherein each basic environment representation represents at least one first entity detected by one or more sensors in an environment of the vehicle;
    allocating a set of basic confidence estimates, wherein each basic confidence estimate of the set is associated to one of the set of basic environment representations, and each basic confidence estimate represents a combination of one or more detection confidences related to the associated basic environment representation;
    associating at least one weight to one of the set of basic confidence estimates, wherein the weight is related to a composite environment representation based on the set of basic environment representations and the weight indicates an effect of a detection error in the basic environment representation, to which the basic confidence estimate is associated to, on a prediction for a second detected entity;
    calculating a weighted composite confidence estimate for the composite environment representation based on a combination of the set of basic confidence estimates with the associated at least one weight; and
    providing the weighted composite confidence estimate as input for an evaluation of the prediction based on the composite environment representation provided by the one or more sensors, wherein one or more of the basic environment representations and the composite environment representation comprise direct and/or indirect indicators and one or more of the basic confidence estimates and the composite confidence estimate comprise confidence indicators wherein direct and/or indirect indicators and the confidence indicators are based on a similar data structure; and
    acting on the evaluation of the prediction to perform an active or passive control of a vehicle by the driving assistance system of the vehicle.

2. The method according to claim 1, wherein the detection confidences are based on at least one of signal strengths associated to sensor data, error propagation indications associated to sensor data, and an application of plausibility rules.

3. The method according to claim 1, wherein the set of basic confidence estimates is allocated by selecting from a plurality of basic confidence estimates those basic confidence estimates associated to the basic environment representations contributing to the composite environment representation.

4. The method according to claim 1, wherein the weight is assigned to minimize a probability of a wrong prediction for the second detected entity.

5. The method according to claim 1, wherein multiple weights are associated in a one-to-one relation to multiple basic confidence estimates and the multiple weights are assigned relative values reflecting the relative importance of the associated basic environment representations for the prediction.

6. The method according to claim 1, wherein a weight reflects the influence of a detection error on the probability for a critical prediction.

7. The method according to claim 6, wherein the critical prediction comprises at least one of a false positive prediction result or a false negative prediction result.

8. The method according to claim 1, wherein calculating the weighted composite confidence estimate comprises at least one of a summation, weighted summation, product, weighted product, and selecting a minimum or maximum.

9. The method according to claim 1, wherein it is decided on whether or not the composite environment representation is used for a prediction by comparing a numerical value of the weighted composite confidence estimate with a numerical value of at least one of a predefined threshold value and numerical values of one or more other confidence estimates.

10. The method according to claim 1, wherein one or more of the basic environment representations and the composite environment representation comprise direct and/or indirect indicators and one or more of the basic confidence estimates and the composite confidence estimate comprise confidence indicators wherein direct and/or indirect indicators and the confidence indicators are based on a similar data structure.

11. The method according to claim 1, wherein the driving assistance system is adapted to perform a cruise control functionality.

12. A computer program product comprising program code portions for performing the method according to claim 1 when the computer program product is executed on a computing device.

13. A driving assistance system for a vehicle, the driving assistance system including a prediction subsystem and comprising:
    a component adapted to accept a set of basic environment representations, wherein each basic environment representation represents at least one first entity detected by one or more sensors in an environment of the vehicle;
    a component adapted to allocate a set of basic confidence estimates, wherein each basic confidence estimate of the set is associated to one of the set of basic environment representations, and each basic confidence estimate represents a combination of one or more detection confidences related to the associated basic environment representation;
    a component adapted to associate at least one weight to one of the basic confidence estimates, wherein the weight is related to a composite environment representation based on the set of basic environment representations and the weight indicates an effect of a detection error in the basic environment representation, to which the basic confidence estimate is associated to, on a prediction for a second detected entity;

a component adapted to calculate a weighted composite confidence estimate for the composite environment representation based on a combination of the set of basic confidence estimates with the associated at least one weight; and a component adapted to provide the weighted composite confidence estimate as input for an evaluation of the prediction based on the composite environment representation provided by the one or more sensors, wherein one or more of the basic environment representations and the composite environment representation comprise direct and/or indirect indicators and one or more of the basic confidence estimates and the composite confidence estimate comprise confidence indicators wherein direct and/or indirect indicators and the confidence indicators are based on a similar data structure; and a component adapted to act on the evaluation of the prediction to perform an active or passive control of a vehicle by the driving assistance system of the vehicle.

14. The system according to claim 13, wherein the prediction subsystem is adapted to perform a context based prediction and a physical prediction.

15. A vehicle comprising a system according to claim 13.

* * * * *